Aug. 19, 1930.  Y. H. KURKJIAN  1,773,148
RUBBER DEVICE FORMER
Filed Feb. 7, 1929
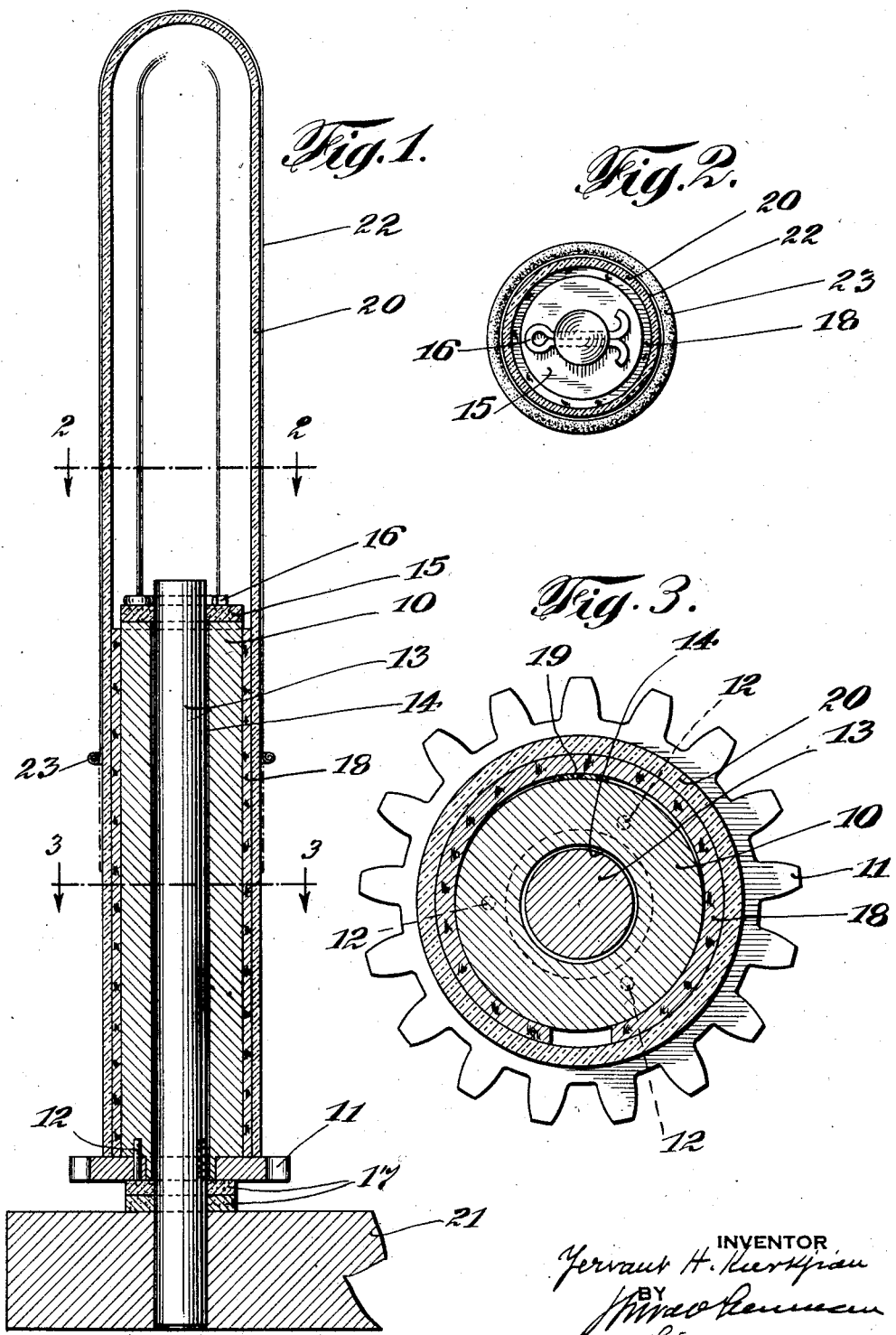

Patented Aug. 19, 1930

1,773,148

UNITED STATES PATENT OFFICE

YERVANT H. KURKJIAN, OF HAWTHORNE, NEW JERSEY, ASSIGNOR TO CARL J. SCHMID, INC., OF NEW YORK, N. Y., A CORPORATION OF NEW JERSEY

RUBBER-DEVICE FORMER

Application filed February 7, 1929. Serial No. 338,245.

My invention relates to devices adapted for the formation of certain rubber articles and refers particularly to former supports suitable for this purpose.

The production of certain rubber articles, such as balloons, finger cots, &c., is accomplished by dipping revolving formers, generally of glass, of the desired shape and size into a rubber solution, depositing a film of rubber thereon, removing the former with its rubber film, vulcanizing the film and removing it from the former.

During the above described process, the glass former is subjected to considerable changes of temperature, causing a contraction and expansion thereof; it is submitted to a side pressure from abutting revolving bead forming devices and is subjected to treatment with water, or other liquids, in order to facilitate the removal of the film and to thoroughly clean the former for the following rubber deposition, and all of these actions are liable to break the glass former or to depreciate the efficiency of its supporting means.

The device of my invention possesses all of the above-mentioned, and other, desirable attributes and presents a means whereby glass, and other suitable formers may be firmly supported, protected from breakage and in which the buffer is of resilient material and entirely enclosed within the former.

By having the supporting buffer entirely enclosed, I am able to make it of cork, sponge rubber or other material having high shock-absorbent, or resilient, properties, which would not be practically possible if it were subjected to the action of atmosphere conditions, and liquids, during the processes in which it is employed.

Another advantage of my device is that because of the complete incorporation of the support within the former, I am able to completely clean the exterior face of the former without effect upon the support.

Another advantage of my device is that because of the complete incorporation of the support within the former, I am able to bring the lower edge of the former in contact with the revolving pinion, thus producing a stronger support for the former against the side pressure incident to the bead-forming brushes.

The above-mentioned, and other, valuable properties of my device will be evident upon a consideration of my specification and its accompanying claims.

In the accompanying drawings illustrating one form of the device of my invention, similar parts are designated by similar numerals.

Figure 1 is a longitudinal central cross-section of one form of my device.

Figure 2 is a section through the line 2—2 of Figure 1.

Figure 3 is a section through the line 3—3 of Figure 1.

The particular form of the device of my invention illustrated in the accompanying drawings comprises a wooden cylindrical core 10, fixedly attached to the fiber sprocket 11 by means of a plurality of pins 12, 12.

A supporting shaft 13 passes through a longitudinal opening in the core 10. The upper portion of the shaft 13 carries a washer 15 held thereon by a cotter-pin 16. The lower portion of the shaft 13 carries the washers 17, 17.

Extending longitudinally of the core 10 and partially encompassing it is a resilient cork buffer 18 secured to the core 10 along the longitudinal edges of the buffer 18. A cork wedge 19 is inserted between the upper portions of the core 10 and the buffer 18 to give the latter greater resiliency.

Surrounding the buffer 18 and abutting thereon is a glass former 20, the lower edge of which rests upon the sprocket 11, and I prefer to make a tight joint between the sprocket 11 and the former 20 by means of a water-proof glass or cement.

In operation, the shaft 13 is inserted within an opening in the base 21, and frictionally held therein, thus supporting the device. The device is then inverted and the former 20 inserted into a proper rubber solution and a rotary movement imparted to the sprocket 11 by any suitable means, thus revolving the core 10, the resilient buffer 18 and the former 20 around the stationary shaft 13. By this means a uniform film of rubber 22 is deposited upon the former 20. The device is then removed, dried and a bead 23 formed of the open end portion of the rubber form after which it is vulcanized and removed from the former 20.

The buffer 18 may be of other soft resilient, or shock absorbing material such as rubber, paper, fiber and other suitable materials, and it may also extend completely around the core 10 or it may consist of a plurality of spaced strips of material.

Further the core 10 and the buffer 18 may be of one piece of suitable material to form the support.

By "resilient buffer", I mean an element formed of suitable shock absorbent, or resilient material, among which are cork, rubber, soft wood and fibrous materials.

It will thus be seen that the support of my device is entirely protected from the effects of the atmosphere, that the entire former may be immersed in, or treated with, water, or other liquids, without such liquids coming into contact with the support, and, further, that because the former is in abutment with the revoluble pinion a much firmer support is given the former than would be the case if the former terminated some distance above the pinion.

I do not limit myself to the particular size, shape, number, arrangement or material of parts as shown and described as these are given simply as a means for clearly explaining the device of my invention.

What I claim is:—

1. In a rubber-device former, in combination, a revoluble support, buffer means carried by the outer face of said support, means capable of causing a revolution of said support, a former surrounding said support and spaced therefrom by resilient means and means closing the open end of the device thus formed.

2. In a rubber-device former, in combination, a stationary shaft, a support revoluble upon said shaft, buffer means exterior of said support, means whereby the support and buffer means may be revolved, a former surrounding said buffer means and spaced therefrom by resilient means and means closing the open end of the device thus formed.

3. In a rubber-device former, in combination, a stationary shaft, a support revoluble upon said shaft, cork buffer means exterior of said support, a former surrounding said buffer and spaced therefrom by resilient means and means closing the open end of the device thus formed.

4. In a rubber-device former, in combination, a stationary shaft, a support revoluble upon said shaft, buffer means exterior of said shaft, a sprocket carried by said support and closing the open end of a former and a former surrounding said buffer means.

5. In a rubber-device former, in combination, a stationary shaft, a support revoluble upon said shaft, buffer means exterior of said shaft, a sprocket carried by said support, and a former abutting upon said sprocket and surrounding said buffer means.

6. In a rubber-device former, in combination, a shaft, a support revoluble upon said shaft, a resilient buffer carried by said shaft upon its outer face, a sprocket carried by said support and closing the open end of a glass former and a glass former surrounding said support and buffer.

7. In a rubber-device former, in combination, a revoluble support, revolving means carried by said support, buffer means exterior of said support and a former abutting upon said revolving means surrounding said buffer means and closure means covering the open end of said former.

8. In a rubber-device former, in combination, a revoluble support, means capable of revolving said support, buffer means exterior of said support, a former surrounding said buffer means and closure means closing the open end of the device thus formed.

Signed at New York city in the county of New York and State of New York this 5th day of February, 1929.

YERVANT H. KURKJIAN.